United States Patent
Ritter et al.

(10) Patent No.: US 10,611,357 B2
(45) Date of Patent: Apr. 7, 2020

(54) BRAKE-BLEEDER SYSTEM AND METHOD

(71) Applicants: David Warren Ritter, Portland, OR (US); Marlan Jameson McCowan, Sr., Portland, OR (US)

(72) Inventors: David Warren Ritter, Portland, OR (US); Marlan Jameson McCowan, Sr., Portland, OR (US)

( * ) Notice: Subject to any disclaimer, the term of this patent is extended or adjusted under 35 U.S.C. 154(b) by 17 days.

(21) Appl. No.: 15/824,982

(22) Filed: Nov. 28, 2017

(65) Prior Publication Data

US 2018/0162343 A1   Jun. 14, 2018

Related U.S. Application Data

(60) Provisional application No. 62/432,174, filed on Dec. 9, 2016.

(51) Int. Cl.
*B60T 17/22* (2006.01)
*F16D 65/00* (2006.01)

(52) U.S. Cl.
CPC ........ *B60T 17/222* (2013.01); *F16D 65/0043* (2013.01)

(58) Field of Classification Search
CPC ........ B60T 17/222; B60T 11/30; B60T 11/26; F16D 65/0043; F16D 2125/16; F15B 21/044
See application file for complete search history.

(56) References Cited

U.S. PATENT DOCUMENTS

| | | | |
|---|---|---|---|
| 2,069,606 A | | 4/1936 | Louis et al. |
| 2,255,676 A | * | 9/1941 | O'Reilly ............... B60T 17/222 188/352 |
| 2,644,548 A | * | 7/1953 | Schiemann ........... B60T 17/222 137/327 |
| 2,872,951 A | * | 2/1959 | Wilkerson ............ B60T 17/222 141/311 R |
| 3,548,978 A | | 12/1970 | Dyke |
| 3,559,405 A | * | 2/1971 | Neilson ................... B60T 11/24 188/152 |
| 3,707,032 A | * | 12/1972 | Brunelle ................. B29C 70/74 138/110 |
| 3,809,359 A | * | 5/1974 | Truelove, Sr. ........ B60T 17/222 141/98 |
| 4,930,192 A | * | 6/1990 | Muhr ...................... F16L 33/03 24/20 CW |
| 5,410,881 A | | 5/1995 | Ellis |
| 5,964,326 A | | 10/1999 | Lee et al. |
| 6,334,459 B1 | | 1/2002 | Berger |
| 2005/0061394 A1 | * | 3/2005 | Awad .................... B60T 17/222 141/98 |
| 2013/0160864 A1 | | 6/2013 | Buchanan |

* cited by examiner

Primary Examiner — Xuan Lan Nguyen
(74) Attorney, Agent, or Firm — Charles Runyan

(57) ABSTRACT

A brake-bleeder system for bleeding two brake calipers using hydraulic brakes simultaneously is disclosed herein. The brake-bleeder system includes a fluid-reservoir with a first-tube detachably coupled to an opening of the fluid-reservoir. A three-way splitter couples the first-tube to a second-tube and a third-tube. The second-tube and the third-tube may connect to brake calipers on a vehicle.

15 Claims, 5 Drawing Sheets

BRAKE-BLEEDER SYSTEM AND METHOD

CROSS REFERENCE TO RELATED APPLICATION

The present application is related to and claims priority to U.S. Provisional Patent Application No. 62/432,174 filed Dec. 9, 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of vehicle maintenance and more specifically relates to brake bleeding.

2. Description of Related Art

A disc brake is a type of brake that uses calipers to squeeze pairs of pads against a disc in order to safely stop a vehicle. Brake bleeding is the procedure performed on hydraulic brake systems whereby the brake lines are purged of any air bubbles. This is necessary because any air bubbles present in the brake system greatly reduces the hydraulic pressure that can be developed within the system.

In order to release air bubbles from a brake line, users must either pay a professional to bleed their brakes, or complete the process at home. Neglecting to release the air can result in brake failure and serious accidents. Currently, bleeding the brakes at home requires the assistance of a second individual and only one brake caliper can be bled at a time while the brakes are pumped. It is not possible for one individual to perform all of the tasks required at the same time. An efficient solution is desired.

U.S. Pat. No. 5,410,881 to Martin J. Ellis relates to a universal one man brake bleeding apparatus. The described universal one man brake bleeding apparatus includes a vacuum activated brake reservoir refilling apparatus and a vacuum activated brake fluid recovery apparatus. The invention utilizes vacuum created during the normal brake bleeding procedure and includes a holding container filled containing fresh brake fluid and an adjustable fluid distribution attachment which is clamped to a vehicle reservoir. An unobstructed path connects the bleeder valve to be bled and a fluid collection container. Both containers utilize check valves. The holding container can only valve air into its chamber, and the collection container can only valve air out of its chamber during the brake bleeding process.

BRIEF SUMMARY OF THE INVENTION

In view of the foregoing disadvantages inherent in the known vehicle maintenance art, the present disclosure provides a novel brake-bleeder system. The general purpose of the present disclosure, which will be described subsequently in greater detail, is to provide a brake-bleeder system for bleeding two brake calipers using hydraulic brakes simultaneously with one user.

A brake-bleeder system for bleeding two brake calipers using hydraulic brakes simultaneously is disclosed herein. The brake-bleeder system includes a fluid-reservoir which may have a volume therein. The fluid-reservoir may be defined by a top, a base, and a side-wall therebetween. The top of the fluid-reservoir includes an opening that may have access to the volume therein. A first-tube may be detachably coupled to the opening. The first-tube may include a first-end and a second-end; the second-end coupled to a three-way splitter. The three-way splitter may have a first-tube-receiver for receiving the second-end of the first-tube, and a second-tube-receiver for receiving a second-tube. The second-tube may have a second-outlet-port opposite the three-way splitter and configured to be coupleable to a first brake caliper. The three-way splitter may further include a third-tube-receiver for receiving a third-tube. The third-tube may have a third-outlet-port opposite the three-way splitter and configured to be coupleable to a second brake caliper.

Contaminants in brake-fluid and air may be expelled from the first brake caliper and the second brake caliper via the second-tube and the third-tube, respectively, and into the fluid-reservoir. The fluid-reservoir may be configured to contain a predetermined amount of the brake-fluid in the volume prior to expelling the brake-fluid and the air. The first-end of the first-tube may be immersed in the predetermined amount of the brake-fluid preventing the flow of the brake-fluid and the air back into the first brake caliper and the second brake caliper.

A method of using a brake-bleeder system is also disclosed herein. The method of using the brake-bleeder system may comprise the steps of: removing a top on a fluid-reservoir, adding a predetermined amount of brake-fluid to a volume of the fluid-reservoir, connecting a three-way splitter to a first-tube, a second-tube, and a third-tube, connecting a second-outlet-port and a third-outlet-port to a first brake caliper and a second brake caliper, respectively, inserting a first-end of the first-tube through an opening in a lid and into the predetermined amount of brake-fluid, and pumping a brake inside a vehicle to expel brake-fluid and air via the first brake caliper and the second brake caliper and into the second-tube and the third-tube, respectively.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a brake-bleeder system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to vehicle maintenance and more particularly to a brake-bleeder system as used to improve the brake bleeding process.

Generally, the present disclosure provides a brake bleeder to users who prefer to perform their own vehicle maintenance with an easy and effective method for bleeding brake calipers. It allows the user to bleed two brake calipers simultaneously. This may eliminate the need for an assistant and save the user time and energy. It ensures that users are easily able to bleed their brakes, preventing brake failure and serious accidents. The present disclosure offers a kit that can be used by amateurs and professionals to bleed brakes in a foolproof manner.

Figure 1:
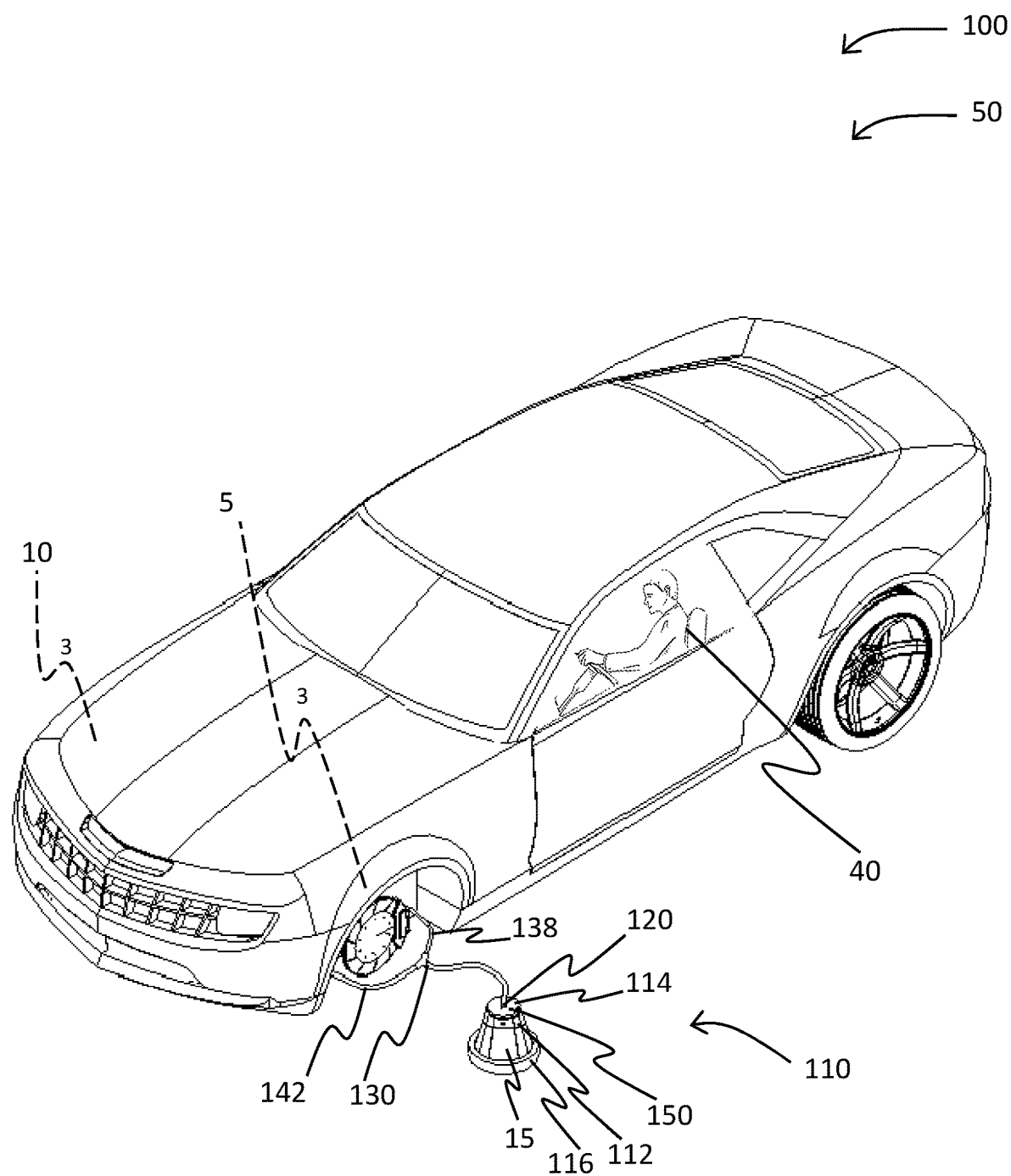
FIG. 1 is a perspective view of the brake-bleeder system during an 'in-use' condition, according to an embodiment of the disclosure.

Referring now more specifically to the drawings by numerals of reference, there is shown in FIGS. 1-4B, various views of a brake-bleeder system for bleeding two brake calipers using hydraulic brakes simultaneously 100. FIG. 1 shows the brake-bleeder system 100 during an 'in-use' condition 50 by a user 40, according to an embodiment of the present disclosure. As illustrated, the brake-bleeder system 100 may include a fluid-reservoir 110 having a volume 112 therein. The fluid-reservoir 110 may be defined by a top 114, a base 116, and a side-wall 118 therebetween. The top 114 of the fluid-reservoir 110 may include an opening 120 and an aperture 150 having access to the volume 112 therein. A first-tube 122 may be detachably coupled to the opening 120; the first-tube 122 may include a first-end 124 and a second-end 126. The second-end 126 of the first-tube 122 may be coupled to a three-way splitter 130. The three-way splitter 130 may be Y-shaped. However, additional shapes (i.e. T-shaped) may be utilized. The three-way splitter 130 may have a first-tube-receiver 132 for receiving the second-end 126 of the first-tube 122, and a second-tube-receiver 134 for receiving a second-tube 138. The second-tube 138 may have a second-outlet-port 140 opposite the three-way splitter 130 and configured to be coupleable to a first brake caliper 5. Moreover, the three-way splitter 130 may include a third-tube-receiver 136 for receiving a third-tube 142. The third-tube 142 may have a third-outlet-port 144 opposite the three-way splitter 130 and configured to be coupleable to a second brake caliper 10.

Contaminants in brake-fluid and air may be expelled from the first brake caliper 5 and the second brake caliper 10 via the second-tube 138 and the third-tube 142, respectively, and into the fluid-reservoir 110. The fluid-reservoir 110 may be configured to contain a predetermined amount of the brake-fluid 15 in the volume 112 prior to expelling the brake-fluid and the air. The first-end 124 of the first-tube 122 may be immersed in the predetermined amount of the brake-fluid 15 preventing the flow of the brake-fluid and the air back into the first brake caliper 5 and the second brake caliper 10.

According to one embodiment, the brake-bleeder system 100 may be arranged as a kit. The kit may include brake-bleeder system 100. The instructions may detail functional relationships in relation to the structure of the brake-bleeder system 100 (such that the brake-bleeder system 100 can be used, maintained, or the like, in a preferred manner).

Figure 2:
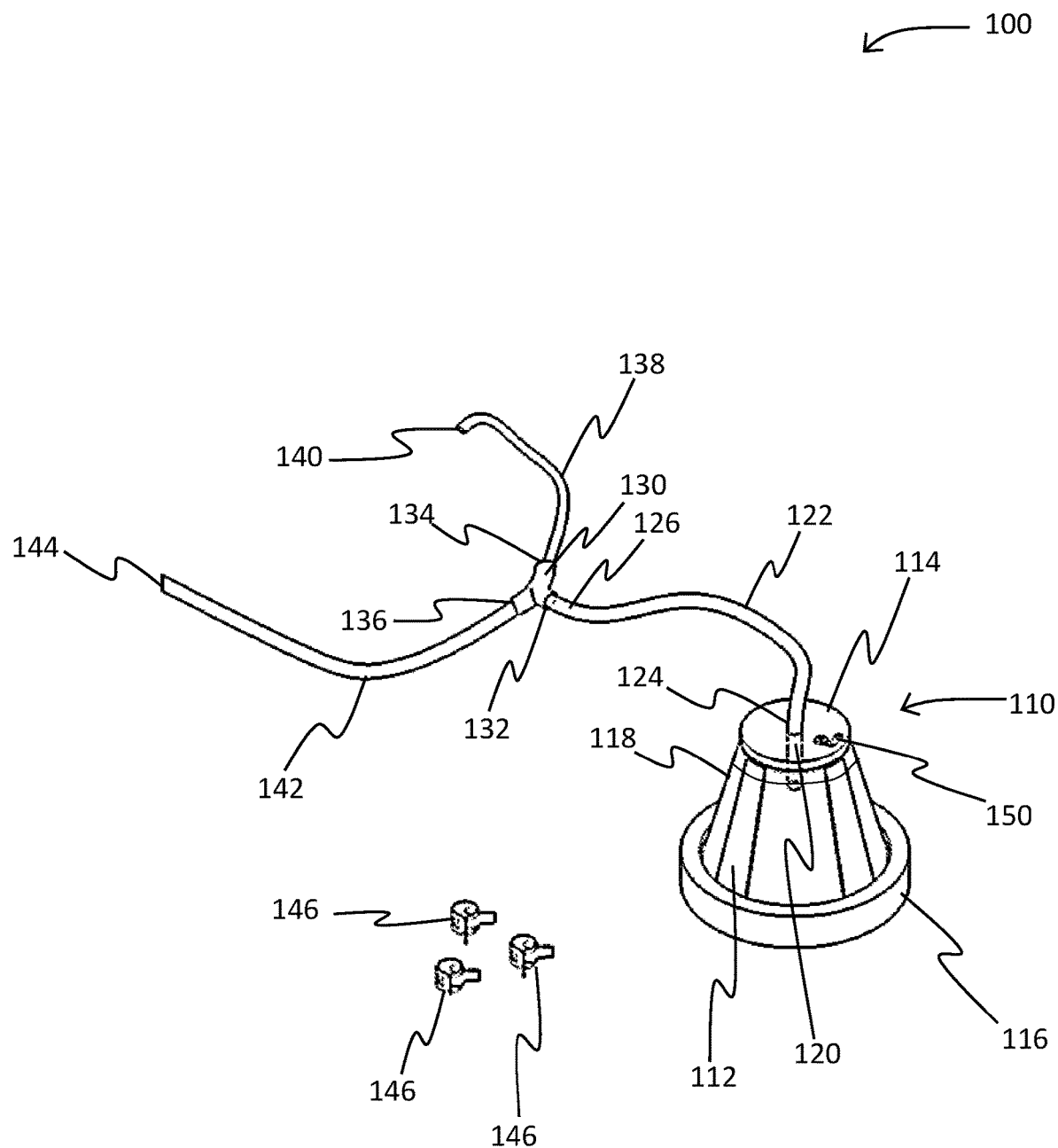
FIG. 2 is a perspective view of the components in the brake-bleeder system of FIG. 1, according to an embodiment of the present disclosure.

FIG. 2 shows a perspective view of the brake-bleeder system 100 of FIG. 1, according to an embodiment of the present disclosure. As above, the brake-bleeder system 100 may include the fluid-reservoir 110 having the volume 112 therein. The fluid-reservoir 110 may be defined by the top 114, the base 116, and the side-wall 118 therebetween. The top 114 of the fluid-reservoir 110 may include the opening 120 having access to the volume 112 therein. Further, the first-tube 122 may be detachably coupled to the opening 120; the first-tube 122 may include the first-end 124 and the second-end 126. The second-end 126 of the first-tube 122 may be coupled to the three-way splitter 130. The three-way splitter 130 may have the first-tube-receiver 132 for receiving the second-end 126, and the second-tube-receiver 134 for receiving the second-tube 138. The second-tube 138 may have the second-outlet-port 140 opposite the three-way splitter 130 and configured to be coupleable to the first brake caliper 5. Moreover, the three-way splitter 130 may include the third-tube-receiver 136 for receiving the third-tube 142. The third-tube 142 may have the third-outlet-port 144 opposite the three-way splitter 130 and configured to be coupleable the second brake caliper 10.

The first-tube 122, the second-tube 138, and the third-tube 142 may comprise an elastic polymeric substance. The elastic polymeric substance may be vulcanized enough to prevent kinks in the first-tube 122, the second-tube 138, and the third-tube 142. To further prevent kinks, the first-tube 122, the second-tube 138, and the third-tube 142 may include a first-tube-inner-lining, a second-tube-inner lining, and a third-tube-inner-lining (not shown) made of fabric. Kinks in the first-tube 122, the second-tube 138, and the third-tube 142 may disrupt the process of brake-bleeding.

The system 100 may further comprise at least three hose clamps 146 for attaching to the first-tube 122, the second-tube 138, and the third-tube 142. The at least three hose clamps 146 may ensure that the first-tube 122, the second-tube 138, and the third-tube 142 stay coupled to the three-way splitter 130.

Figure 3:
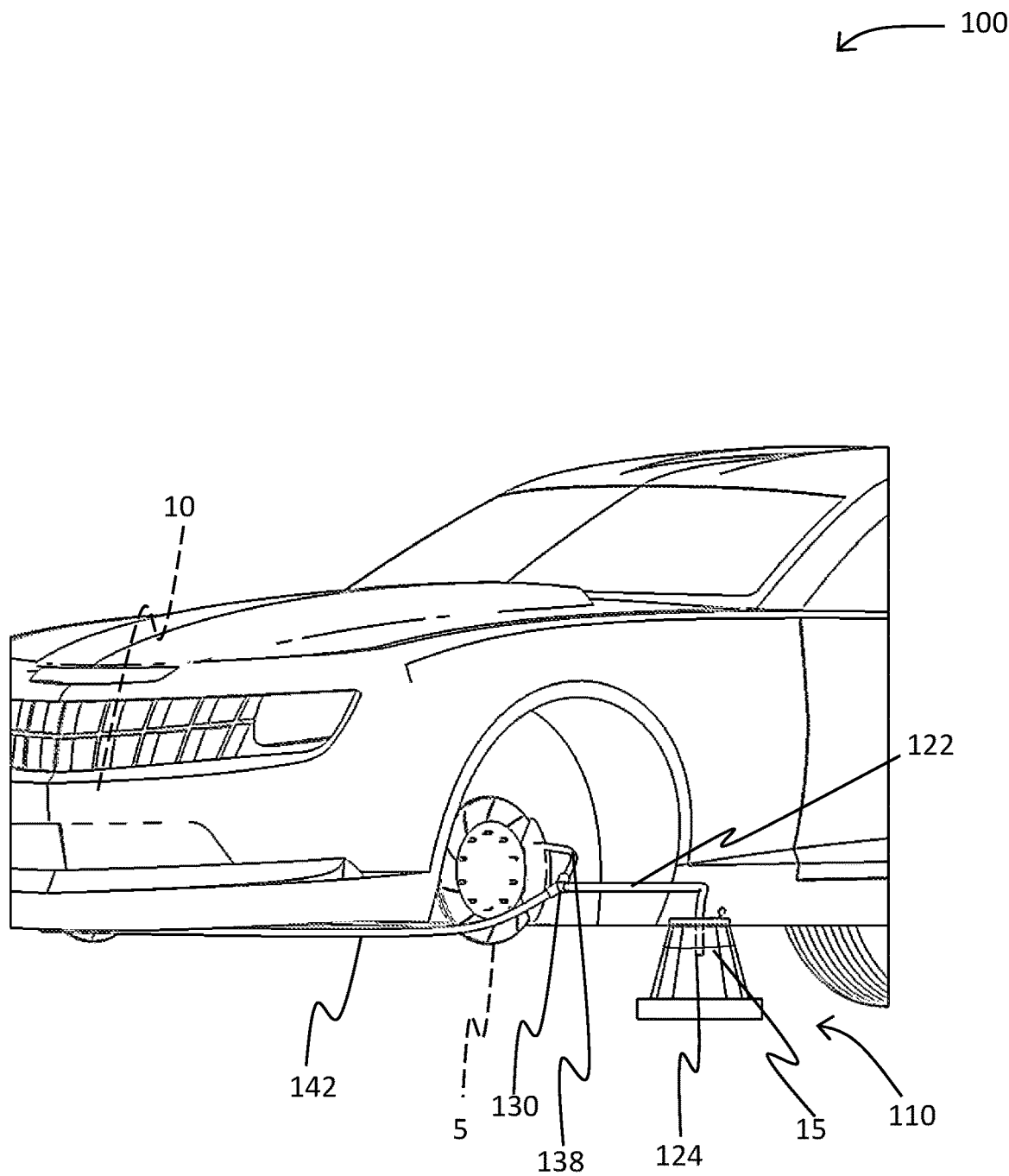
FIG. 3 is a perspective view of the brake-bleeder system of FIG. 1, according to an embodiment of the present disclosure.

FIG. 3 shows a perspective view of the brake-bleeder system 100 of FIG. 1, according to an embodiment of the present disclosure. As above, the brake-bleeder system 100 may include the fluid-reservoir 110 having the volume 112 therein. The fluid-reservoir 110 may be defined by the top 114, the base 116, and the side-wall 118 therebetween. The top 114 of the fluid-reservoir 110 may include the opening 120 having access to the volume 112 therein. Further, the first-tube 122 may be detachably coupled to the opening 120; the first-tube 122 may include the first-end 124 and the second-end 126. The second-end 126 of the first-tube 122 may be coupled to the three-way splitter 130. The three-way splitter 130 may have the first-tube-receiver 132 for receiving the second-end 126, and the second-tube-receiver 134 for receiving the second-tube 138. The second-tube 138 may have the second-outlet-port 140 opposite the three-way splitter 130 and configured to be coupleable to the first brake caliper 5. Moreover, the three-way splitter 130 may include the third-tube-receiver 136 for receiving the third-tube 142. The third-tube 142 may have the third-outlet-port 144 opposite the three-way splitter 130 and configured to be coupleable the second brake caliper 10. Additionally, the second-tube 138 may include a second-tube length that is shorter than a third-tube length. This may enable the third-tube 142 to have sufficient length to reach the second brake caliper 10.

Contaminants in brake-fluid and air may be expelled from the first brake caliper 5 and the second brake caliper 10 via the second-tube 138 and the third-tube 142, respectively, and into the fluid-reservoir 110. The fluid-reservoir 110 may be configured to contain the predetermined amount of the brake-fluid 15 in the volume 112 prior to expelling the brake-fluid and the air. The first-end 124 of the first-tube 122 may be immersed in the predetermined amount of the brake-fluid 15 preventing the flow of the brake-fluid and the air back into the first brake caliper 5 and the second brake caliper 10. The first-end 124 may be immersed approximately 1 inch deep. The predetermined amount of the brake-fluid 15 in combination with the lengths of the second-tube 138 and the third-tube 142, may create a lower pressure thus preventing backflow of contaminants into the first brake caliper 5 and the second brake caliper 10. The second-tube length may be approximately 2 ft. 11.25 in, and the third-tube length may be approximately 5 ft. 3.75 in.

Figures 4A, 4B:
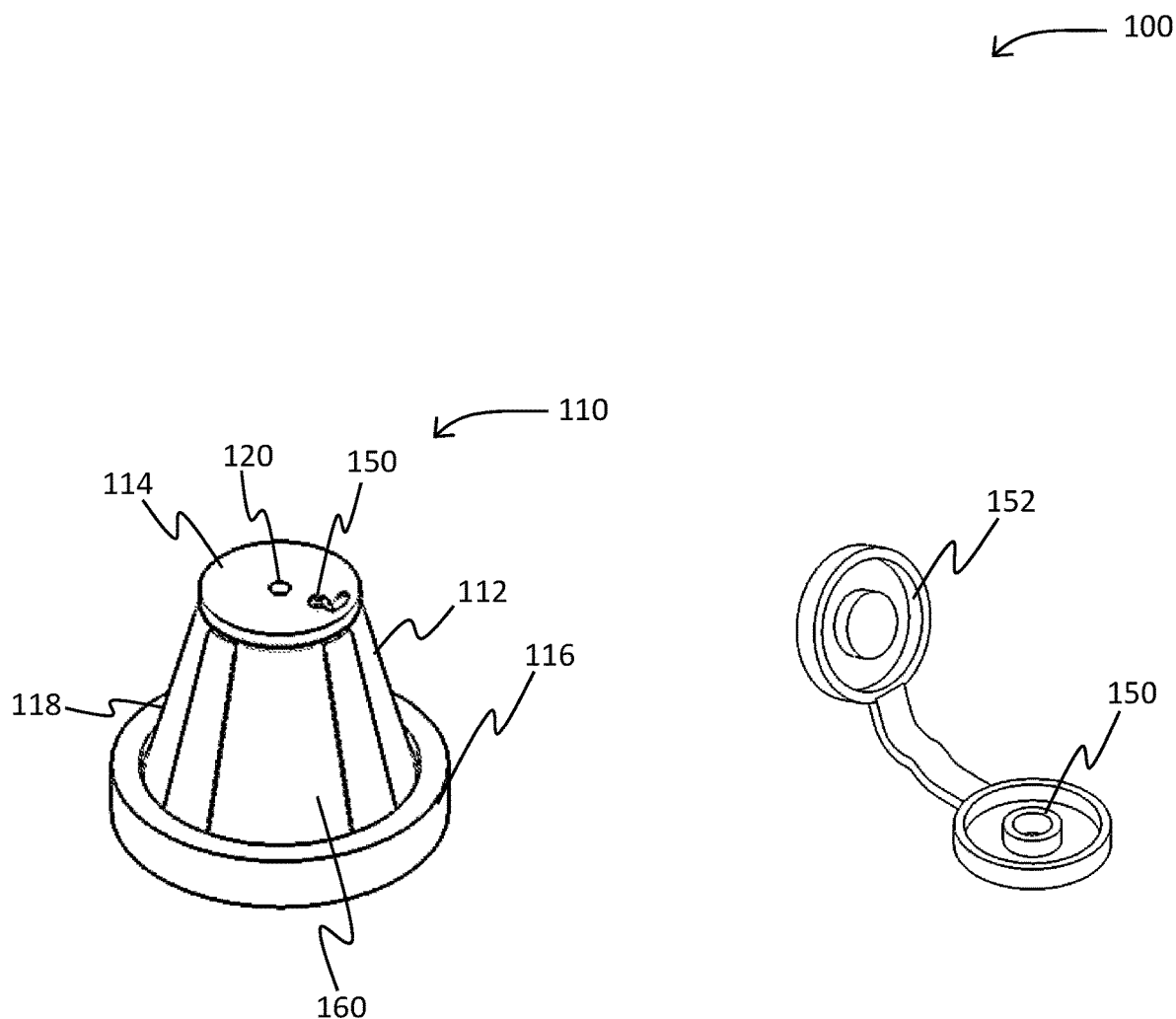
FIG. 4A is a perspective view of a fluid-reservoir and at least three hose clamps of FIG. 1, according to an embodiment of the present disclosure.
FIG. 4B is a perspective view of an aperture of FIG. 1, according to an embodiment of the present disclosure.

FIG. 4A shows a perspective view of the brake-bleeder system 100 of FIG. 1, according to an embodiment of the present disclosure. As above, the brake-bleeder system 100 may include the fluid-reservoir 110 having the volume 112 therein. The fluid-reservoir 110 may be defined by the top 114, the base 116, and the side-wall 118 therebetween. The base 116 may include a height that is at most 1 inch. Further, the base 116 and the side-wall 118 may be integral to one another. The side-wall 118 may be tapered from the base 116 of the fluid-reservoir 110 to the top 114 of the fluid-reservoir 110. The side-wall 118 of the fluid-reservoir 110 may include at least one transparent panel 160 for viewing the contents within the volume 112. The top 114 of the fluid-reservoir 110 may include the opening 120 having access to the volume 112 therein. The opening 120 of the top 114 of the fluid-reservoir 110 may cylindrical for sealingly receiving the first-end 124 of the first-tube 122. The top 114 of the fluid-reservoir 110 may be removeable. The top 114 of the fluid-reservoir 110 may further comprise the aperture 150 in connection to the volume 112 of the fluid-reservoir 110.

FIG. 4B shows a perspective view of the brake-bleeder system 100 of FIG. 1, according to an embodiment of the present disclosure. As above, the brake-bleeder system 100 may include the aperture 150 in connection to the volume 112 of the fluid-reservoir 110. The aperture 150 may have a diameter between about 0.25 inches and about 1 inch. The aperture 150 may further include a removeable-cap 152. The removeable-cap 152 may be partially connected to the aperture 150 so as not to misplace the removeable-cap 152 when removed from the aperture 150.

Figure 5:
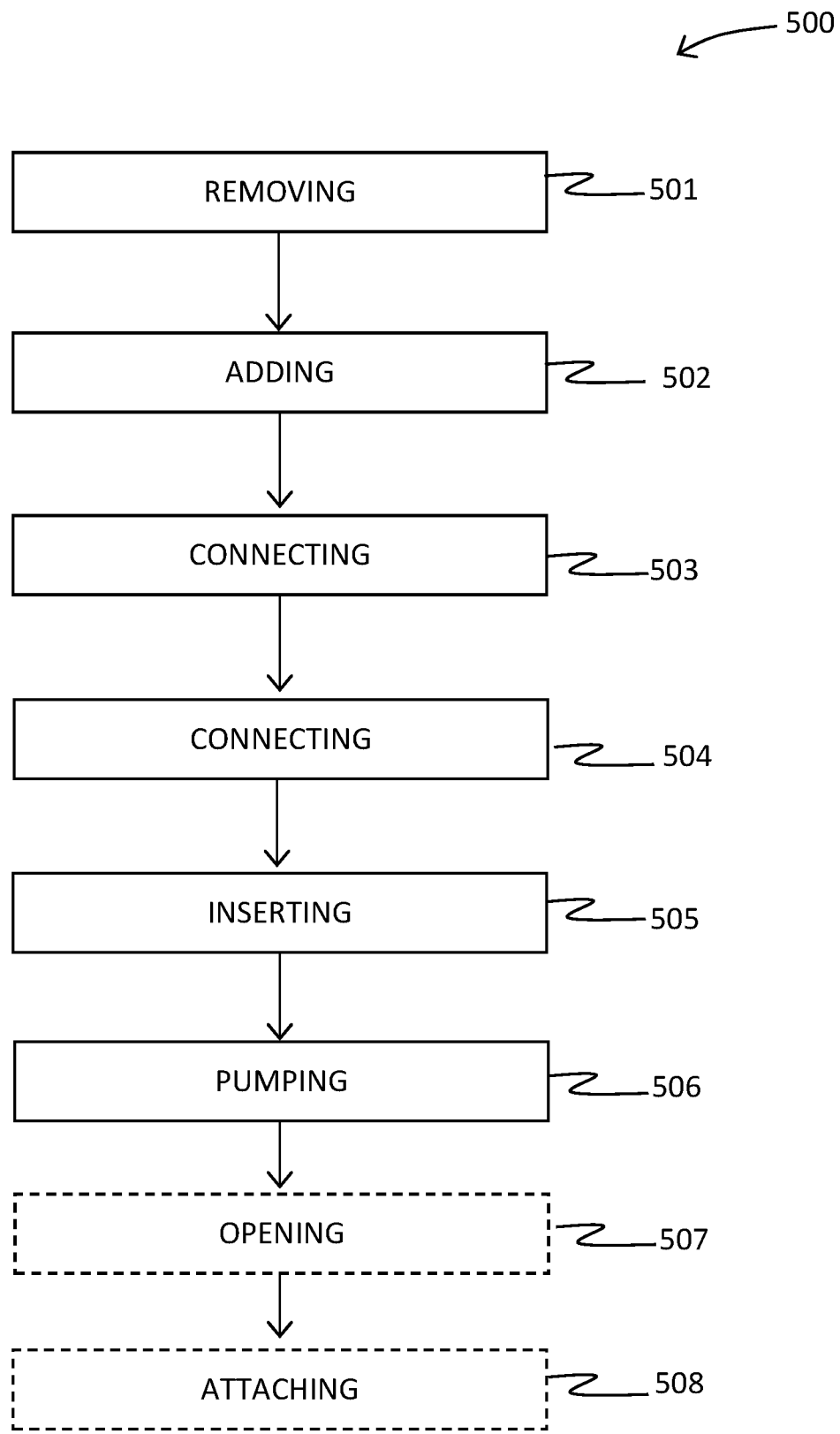
FIG. 5 is a flow diagram illustrating a method of use for brake-bleeder system, according to an embodiment of the present disclosure.

FIG. 5 is a flow diagram illustrating a method of using a brake-bleeder system 500, according to an embodiment of the present disclosure. As illustrated, the method of using a brake-bleeder system 500 may include the steps of: step one 501; removing a top on a fluid-reservoir, step two 502; adding a predetermined amount of brake-fluid to a volume of the fluid-reservoir, step three 503; connecting a three-way splitter to a first-tube, a second-tube, and a third-tube, step four 504; connecting a second-outlet-port and a third-outlet-port to a first brake caliper and a second brake caliper, respectively, step five 505; inserting a first-end of the first-tube through an opening in a lid and into the predetermined amount of brake-fluid, step six 506; pumping a brake inside a vehicle to expel brake-fluid and air via the first brake caliper and the second brake caliper and into the second-tube and the third-tube, respectively, step seven 507; opening a removeable-cap partially connected to an aperture and providing air to the volume of the fluid-reservoir, and step eight 508; attaching at least three hose clamps to the first-tube, the second-tube, and the third-tube.

It should be noted that steps 507 and 508 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for brake-bleeder system for bleeding two brake calipers using hydraulic brakes simultaneously 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A brake-bleeder system for bleeding two brake calipers using hydraulic brakes simultaneously, the system comprising:
    a fluid-reservoir having a top, a base, and a side-wall, the top including an opening into the fluid-reservoir wherein the top of the fluid-reservoir further comprises an aperture with a removable cap and a diameter between about 0.25 inches and about 1 inch wherein the aperture connects to the volume of the fluid-reservoir;
    a three-way splitter with a first, second, and third connection port;
    a first-tube having a first end detachably coupled to the opening and another end connected to the first port;
    a second-tube having one end detachably coupled to the second port having a second end coupleable to a first brake caliper;
    a third-tube having one end detachably coupled to the third port having a second end coupleable to a second brake caliper;
wherein brake-fluid and air are expelled from the first brake caliper and the second brake caliper via the second-tube and the third-tube, respectively, and into the fluid-reservoir; and
wherein the fluid-reservoir is configured to contain a predetermined amount of said brake-fluid in the volume prior to expelling the brake-fluid and the air, the first-end of the first-tube is immersed in the predetermined amount of the brake-fluid preventing the flow of the brake-fluid and the air back into the first brake caliper and the second brake caliper.

2. The brake-bleeder system of claim 1, further comprising at least three hose clamps for attaching to the first-tube, the second-tube, and the third-tube.

3. The brake-bleeder system of claim 1, wherein the top of the fluid-reservoir is removeable.

4. The brake-bleeder system of claim 1, wherein the removeable-cap is partially connected to the aperture.

5. The brake-bleeder system of claim 1, wherein the opening of the top of the fluid-reservoir is cylindrical for sealingly receiving the first-end of the first-tube.

6. The brake-bleeder system of claim 1, wherein the three-way splitter is Y-shaped.

7. A brake-bleeder system for bleeding two brake calipers using hydraulic brakes simultaneously, the system comprising:
   a fluid-reservoir having a top, a base, and a side-wall, the top including an opening into the fluid-reservoir;
   a three-way splitter with a first, second, and third connection port;
   a first-tube having a first end detachably coupled to the opening and another end connected to the first port;
   a second-tube having one end detachably coupled to the second port having a second end coupleable to a first brake caliper;
   a third-tube having one end detachably coupled to the third port having a second end coupleable to a second brake caliper;
   wherein brake-fluid and air are expelled from the first brake caliper and the second brake caliper via the second-tube and the third-tube, respectively, and into the fluid-reservoir;
   wherein the fluid-reservoir is configured to contain a predetermined amount of said brake-fluid in the volume prior to expelling the brake-fluid and the air, the first-end of the first-tube is immersed in the predetermined amount of the brake-fluid preventing the flow of the brake-fluid and the air back into the first brake caliper and the second brake caliper; and
   wherein the second-tube includes a second-tube length that is approximately 2 ft. 11.25 in, and the third-tube includes a third-tube length that is approximately 5 ft. 3.75 in.

8. The brake-bleeder system of claim 1, wherein the base includes a height that is at most 1 inch.

9. The brake-bleeder system of claim 1, wherein the base and the side-wall are integral to one another.

10. The brake-bleeder system of claim 1, wherein the side-wall is tapered from the base of the fluid-reservoir to the top of the fluid reservoir.

11. The brake-bleeder system of claim 1, wherein the side-wall of the fluid-reservoir includes at least one transparent panel.

12. The brake-bleeder system of claim 1, wherein the first-tube, the second-tube, and the third-tube comprises an elastic polymeric substance.

13. The brake-bleeder system of claim 12, wherein the first-tube, the second-tube, and the third-tube further include a first-tube-inner-lining, a second-tube-inner lining, and a third-tube-inner-lining made of fabric.

14. A brake-bleeder system, the system comprising:
   a fluid-reservoir having a volume therein, the fluid-reservoir defined by a top, a base, and a side-wall therebetween, the top of the fluid-reservoir includes an opening having access to the volume therein;
   a first-tube detachably coupled to the opening, the first-tube including a first-end and a second-end, the second-end coupled to a three-way splitter, the three-way splitter having;
   a first-tube-receiver for receiving the second-end,
   a second-tube-receiver for receiving a second-tube, the second-tube having a second-outlet-port opposite the three-way splitter and configured to be coupleable to a first brake caliper, and
   a third-tube-receiver for receiving a third-tube, the third-tube having a third-outlet-port opposite the three-way splitter and configured to be coupleable to a second brake caliper;
   wherein brake-fluid and air are expelled from the first brake caliper and the second brake caliper via the second-tube and the third-tube, respectively, and into the fluid-reservoir;
   wherein the fluid-reservoir is configured to contain a predetermined amount of said brake-fluid in the volume prior to expelling the brake-fluid and the air, the first-end of the first-tube is immersed in the partial amount of the brake-fluid preventing the flow of the brake-fluid and the air back into the first brake caliper and the second brake caliper;
   further comprising at least three hose clamps for attaching to the first-tube, the second-tube, and the third-tube;
   wherein the top of the fluid-reservoir is removeable;
   wherein the top of the fluid-reservoir further comprises an aperture in connection to the volume of the fluid-reservoir;
   wherein the aperture has a diameter between about 0.25 inches and about 1 inch;
   wherein the aperture includes a removeable-cap;
   wherein the removeable-cap is partially connected to the aperture;
   wherein the opening of the top of the fluid-reservoir is cylindrical for sealingly receiving the first-end of the first-tube;
   wherein the three-way splitter is Y-shaped;
   wherein the second-tube includes a second-tube length that is shorter than a third tube length;
   wherein the base includes a height that is at most 1 inch;
   wherein the base and the side-wall are integral to one another;
   wherein the side-wall is tapered from the base of the fluid-reservoir to the top of the fluid reservoir;
   wherein the side-wall of the fluid-reservoir includes at least one transparent panel;
   wherein the first-tube, the second-tube, and the third-tube comprises an elastic polymeric substance; and
   wherein the first-tube, the second-tube, and the third-tube further include a first-tube-inner-lining, a second-tube-inner lining, and a third-tube-inner-lining made of fabric.

15. The brake-bleeder system of claim 14, further comprising set of instructions; and
   wherein the brake-bleeder system is arranged as a kit.

* * * * *